US012652721B2

(12) United States Patent
Hong

(10) Patent No.: US 12,652,721 B2
(45) Date of Patent: Jun. 9, 2026

(54) METHOD FOR CONTROLLING CONNECTION SWITCHING

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 306 days.

(21) Appl. No.: 18/570,026

(22) PCT Filed: Jun. 17, 2021

(86) PCT No.: PCT/CN2021/100745
§ 371 (c)(1),
(2) Date: Dec. 13, 2023

(87) PCT Pub. No.: WO2022/261916
PCT Pub. Date: Dec. 22, 2022

(65) Prior Publication Data
US 2024/0284546 A1     Aug. 22, 2024

(51) Int. Cl.
*H04W 76/27* (2018.01)

(52) U.S. Cl.
CPC .................................. *H04W 76/27* (2018.02)

(58) Field of Classification Search
CPC ..... H04W 76/27; H04W 76/38; H04W 8/183; H04W 60/005; H04W 76/01
See application file for complete search history.

(56) References Cited

U.S. PATENT DOCUMENTS

| | | | | |
|---|---|---|---|---|
| 2021/0345432 A1* | 11/2021 | Yang | .................... | H04W 76/15 |
| 2022/0141734 A1* | 5/2022 | Chen | ................... | H04W 36/033 |
| | | | | 370/331 |
| 2022/0167213 A1* | 5/2022 | Wang | ................... | H04W 8/183 |

(Continued)

FOREIGN PATENT DOCUMENTS

| | | |
|---|---|---|
| CN | 110337826 A | 10/2019 |
| CN | 110383891 A | 10/2019 |

(Continued)

OTHER PUBLICATIONS

PCT/CN2021/100745 International Search Report dated Mar. 10, 2022, 2 pages.

(Continued)

*Primary Examiner* — Dady Chery
(74) *Attorney, Agent, or Firm* — Cozen O'Connor

(57) ABSTRACT

A method for controlling connection switching in a communication network is executed by an access network device and includes sending first indication information to a terminal device, the first indication information being used for indicating a connection switching configuration to the terminal device, and the terminal device comprising at least two user identity recognition modules. Therefore, the terminal device may disconnect a connection with the access network device according to an instruction of a network device, so as to ensure that the communication transmission of a currently connected access network device is not affected, and also that the failure of another access network service is prevented, thereby improving the reliability of a multi-card terminal device.

16 Claims, 4 Drawing Sheets sending first indication information to a terminal device via an RRC message, in which the first indication information is configured to indicate N connection switching configurations for the terminal device, and the terminal device includes at least two subscriber identity recognition modules, where N may be a positive integer greater than 1 — 31 sending second indication information to the terminal device, in which the second indication information is configured to activate at least one connection switching configuration — 32

(56)             References Cited

U.S. PATENT DOCUMENTS

| | | | | |
|---|---|---|---|---|
| 2022/0210856 A1* | 6/2022 | Zhang | .................. | H04W 76/34 |
| 2022/0256501 A1* | 8/2022 | Peng | .................... | H04W 8/205 |

FOREIGN PATENT DOCUMENTS

| | | |
|---|---|---|
| CN | 111030776 A | 4/2020 |
| CN | 111918270 A | 11/2020 |
| CN | 112616186 A | 4/2021 |
| WO | WO 2021042310 A1 | 3/2021 |

OTHER PUBLICATIONS

Chinese Patent Application No. 202180001869,6, Office Action
with English translation dated Mar. 7, 2025, 16 pages.
European Patent Application No. 21945501.1 Search and Opinion
dated Mar. 12, 2025, 10 pages.

* cited by examiner

access network device 11                    terminal device 12

FIG. 1

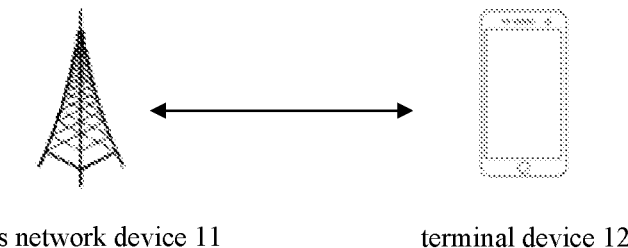

sending first indication information to a terminal device, in which the first indication information is configured to indicate a connection switching configuration for the terminal device, and the terminal device includes at least two subscriber identity recognition modules ⟍21

FIG. 2

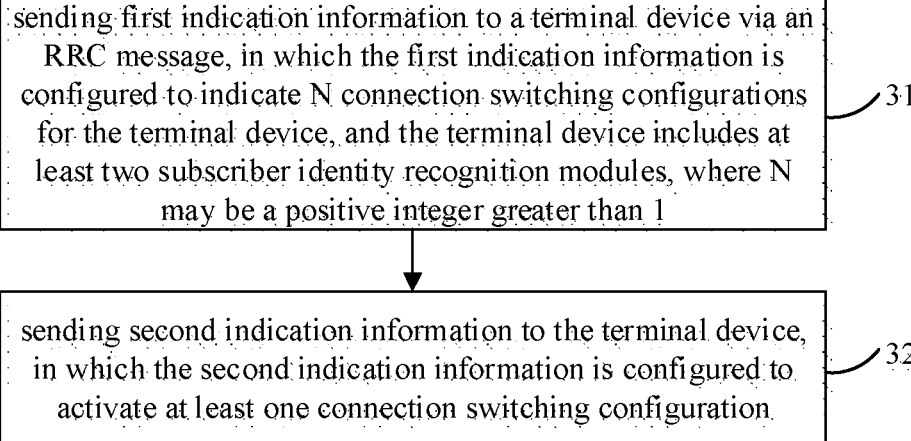

sending first indication information to a terminal device via an RRC message, in which the first indication information is configured to indicate N connection switching configurations for the terminal device, and the terminal device includes at least two subscriber identity recognition modules, where N may be a positive integer greater than 1 ⟍31 sending second indication information to the terminal device, in which the second indication information is configured to activate at least one connection switching configuration ⟍32

FIG. 3

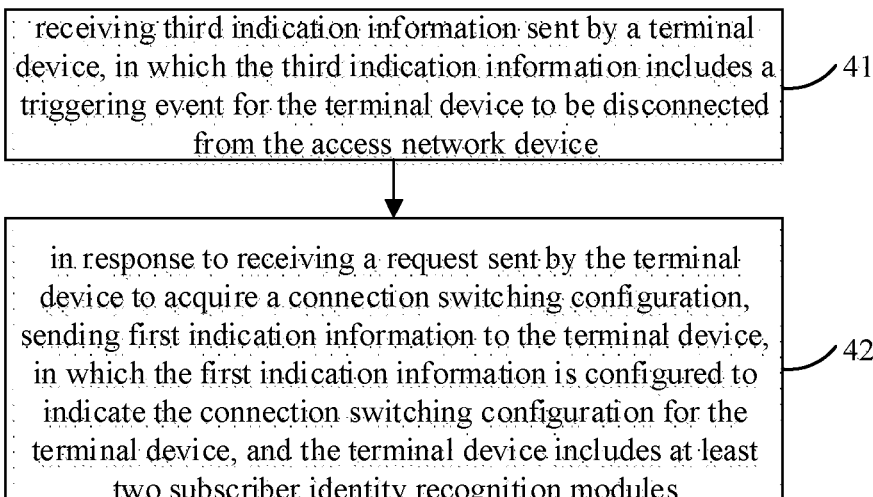

receiving third indication information sent by a terminal device, in which the third indication information includes a triggering event for the terminal device to be disconnected from the access network device — 41 in response to receiving a request sent by the terminal device to acquire a connection switching configuration, sending first indication information to the terminal device, in which the first indication information is configured to indicate the connection switching configuration for the terminal device, and the terminal device includes at least two subscriber identity recognition modules — 42

FIG. 4

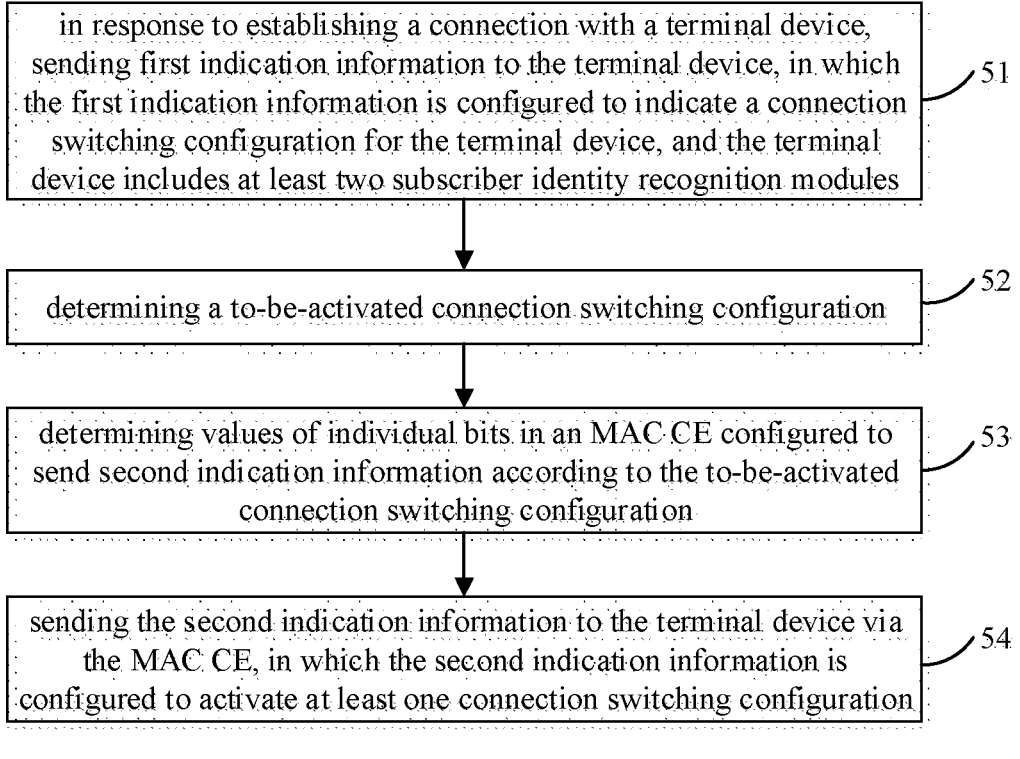

in response to establishing a connection with a terminal device, sending first indication information to the terminal device, in which the first indication information is configured to indicate a connection switching configuration for the terminal device, and the terminal device includes at least two subscriber identity recognition modules — 51 determining a to-be-activated connection switching configuration — 52 determining values of individual bits in an MAC CE configured to send second indication information according to the to-be-activated connection switching configuration — 53 sending the second indication information to the terminal device via the MAC CE, in which the second indication information is configured to activate at least one connection switching configuration — 54

FIG. 5

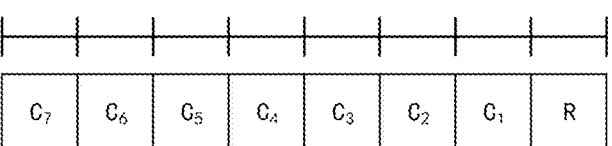

| $C_7$ | $C_6$ | $C_5$ | $C_4$ | $C_3$ | $C_2$ | $C_1$ | R |

FIG. 5A

METHOD FOR CONTROLLING CONNECTION SWITCHING

CROSS-REFERENCE TO RELATED APPLICATIONS

The present application is a National Stage of International Application No. PCT/CN2021/100745, filed on Jun. 17, 2021, the contents of which are incorporated herein by reference for all purposes.

TECHNICAL FIELD

The present disclosure relates to the field of wireless communication technology, and more particularly to a method and apparatus for controlling connection switching.

BACKGROUND

With the development of the wireless communication technology, more and more terminal devices may support a multi-card mode. For the terminal device that supports the multi-card mode, it may use a plurality of different processing methods, such as dual-card single-standby, dual-card dual-standby single-pass, dual-card dual-standby dual-pass, and these processing methods are usually implemented according to the manufacturer(s).

Usually, when a multi-card terminal device communicates with a first system, it may be necessary to frequently monitor paging, perform measurements, and read system messages for a second system. Therefore, a performance of the multi-care terminal device in the first system may be affected. It may not be possible to establish a service connection with the second system without performing operations such as monitoring the paging, performing the measurements, reading the system messages for the second system. In addition, when the multi-card terminal device receives a paging message of the second system, it also needs to determine whether it needs to respond to the paging. If the multi-card terminal device never responds to the paging message of the second system, the second system will keep paging the terminal device until a maximum number of times is reached. This will not only waste signaling resources, but may also trigger a error condition in the second system.

Therefore, reliable utilization of the multi-card terminal device needs to be ensured.

SUMMARY

In a first aspect, embodiments of the present disclosure provide a method for controlling connection switching, which is performed by an access network device and includes: sending first indication information to a terminal device. The first indication information indicates a connection switching configuration for the terminal device, and the terminal device includes at least two subscriber identity recognition modules.

In a second aspect, embodiments of the present disclosure provide a communication device, which includes a processor that, when invokes a computer program in a memory, executes the method according to the first aspect described above.

In a third aspect, embodiments of the present disclosure provide a communication device, which includes a processor and a memory having stored therein a computer program that, when executed by the processor, causes the method according to the first aspect described above to be implemented.

In a fourth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the first aspect described above.

In a fifth aspect, embodiments of the present disclosure provide a system for controlling connection switching, which includes the communication device according to the second aspect, or the communication device according to the third aspect, or the communication device according to the fourth aspect.

In a sixth aspect, embodiments of the present disclosure provide a non-transitory computer-readable storage medium having stored therein instructions that, when executed, cause the method according to the first aspect described above to be implemented.

In a seventh aspect, the present disclosure provides a chip system, which includes at least one processor and an interface, for supporting an access network device to implement functions involved in the first aspect, for example, determining or processing at least one of data and information involved in the above method. In a possible design, the chip system further includes a memory for storing necessary computer programs and data of the access network device. The chip system may consist of chips, or may include chips and other discrete devices.

BRIEF DESCRIPTION OF THE DRAWINGS

In order to more clearly illustrate the technical solutions in embodiments of the present disclosure or the background, drawings that need to be used in embodiments of the present disclosure or the background will be described below.

FIG. 1 is a schematic diagram of an architecture of a communication system provided by an embodiment of the present disclosure.

FIG. 2 is a schematic flowchart of a method for controlling connection switching provided by an embodiment of the present disclosure.

FIG. 3 is a schematic flowchart of a method for controlling connection switching provided by another embodiment of the present disclosure.

FIG. 4 is a schematic flowchart of a method for controlling connection switching provided by a further embodiment of the present disclosure.

FIG. 5 is a schematic flowchart of a method for controlling connection switching provided by a further embodiment of the present disclosure.

FIG. 5A is a schematic block diagram of a control element of a media access control provided by an embodiment of the present disclosure.

DETAILED DESCRIPTION

Figure 5B:
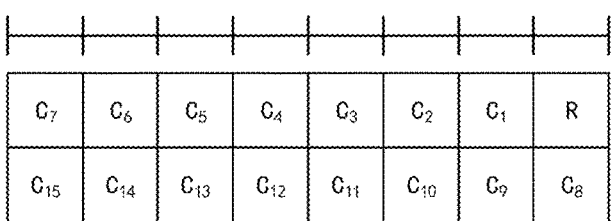
FIG. 5B is a schematic block diagram of a control element of a media access control provided by a further embodiment of the present disclosure.

For ease of understanding, terms involved in the present disclosure are first introduced as follows.

1. Radio Resource Control (RRC)

The RRC may also be called a radio resource management (RRM) or a radio resource allocation (RRA), which refers to a management, control and scheduling of a radio resource via a certain strategy and means. On the premise of satisfying service quality requirements, limited radio network resources are fully utilized as much as possible to ensure that a planned coverage area is reached, and a service capacity and a resource utilization are improved as much as possible.

In order to better understand a method for controlling connection switching described in embodiments of the present disclosure, a communication system applicable to the embodiments of the present disclosure is firstly described below.

FIG. 1 is a schematic diagram of an architecture of a communication system provided by an embodiment of the present disclosure. Referring to FIG. 1, the communication system may include, but is not limited to, an access network device and a terminal device. The number and forms of the devices shown in FIG. 1 are only as an example and do not constitute a limitation on the embodiments of the present disclosure. The communication system may include two or more access network devices, two or more terminal devices in practical applications. As an example for illustration, the communication system shown in FIG. 1 includes one access network device 11 and one terminal device 12.

It should be noted that the technical solutions of the embodiments of the present disclosure may be applied to various communication systems, for example, a long term evolution (LTE) system, a 5th generation (5G) mobile communication system, a 5G new radio (NR) system, or other future new mobile communication systems.

The access network device 11 in embodiments of the present disclosure is an entity on a network side for sending or receiving signals. For example, the access network device 11 may be an evolved NodeB (eNB), a transmission reception point (TRP), a next generation NodeB (gNB) in the NR system, a base station in other future mobile communication systems, or an access node in a wireless fidelity (WiFi®) system. The specific technology and specific device form adopted by the access network device are not limited in the embodiments of the present disclosure. The access network device provided by embodiments of the present disclosure may be composed of a central unit (CU) and distributed units (DU). The CU may also be called a control unit. Using the CU-DU structure allows to split a protocol layer of the access network device, such as the base station, a part of functions of the protocol layer is centrally controlled in the CU, some or all of the remaining functions of the protocol layer are distributed in the DUs, and the CU centrally controls the DUs.

The terminal device 12 in embodiments of the present disclosure is an entity on a user side for receiving or sending signals, such as a mobile phone. The terminal device may also be called a terminal, a user equipment (UE), a mobile station (MS), and a mobile terminal (MT). The terminal device may be a car with a communication function, a smart car, a mobile phone, a wearable device, a tablet Pad, a computer with a wireless transceiving function, a virtual reality (VR) terminal device, an augmented reality (AR) terminal device, a wireless terminal device in an industrial control, a wireless terminal device in a self-driving, a wireless terminal device in a remote medical surgery, a wireless terminal device in a smart grid, a wireless terminal device in a transportation safety, a wireless terminal device in a smart city, a wireless terminal device in a smart home, etc. The specific technology and the specific device form adopted by the terminal device are not limited in the embodiments of the present disclosure.

It can be understood that the communication system described in embodiments of the present disclosure is intended to illustrate the technical solutions of the embodiments of the present disclosure more clearly, and does not constitute a limitation on the technical solutions provided by the embodiments of the present disclosure. Those of ordinary skill in the art will know that with an evolution of a system architecture and an emergence of a new service scenario, the technical solutions provided by the embodiments of the present disclosure are also applicable to similar technical problems.

A method and apparatus for controlling connection switching provided by the present disclosure will be described in detail below with reference to the accompanying drawings.

Referring to FIG. 2, which is a schematic flowchart of a method for controlling connection switching provided by embodiments of the present disclosure, the method is performed by an access network device. As shown in FIG. 2, the method may include, but is not limited to, a following step.

In step 21, first indication information is sent to a terminal device, in which the first indication information is configured to indicate a connection switching configuration for the terminal device, and the terminal device includes at least two subscriber identity recognition modules.

The connection switching configuration may be configuration information used to indicate that the terminal device is disconnected from the access network device.

In addition, the subscriber identity recognition module (SIM) is also called an SIM card, or it may also be a universal subscriber identity recognition module (USIM), which may represent identity information when the terminal device communications with different access network devices.

Usually, even if there are a plurality of SIM cards in the terminal device, the terminal device may only communicate with an access network device corresponding to one SIM card at a certain time, and cannot communicate with other access network devices corresponding to other SIM cards at the same time.

Correspondingly, when the terminal device communicates with an access network device corresponding to a certain SIM card, it often needs to monitor paging, perform measurements, read system messages for other access network devices corresponding to other SIM cards. Therefore, a performance of the access network device in the current communication may be affected. It is not possible to establish service connections with other access network devices without performing operations such as monitoring paging, performing the measurements, reading the system messages for other access network devices, which will not only cause a waste of communication resources, but may also affect a normal operation for a communication transmission.

In embodiments of the present disclosure, for a terminal device with the plurality of SIM cards, the access network device may send the first indication information for indicating the connection switching configuration for the terminal device, so that the terminal device may learn the connection switching configuration according to the first indication information, and perform switching the connection based on the connection switching configuration. This not only ensures that a communication transmission of a currently connected access network device will not be affected, but also avoids a failure of other access network services, thus improving a reliability of a multi-card terminal device.

Optionally, the first indication information may indicate a duration for which the terminal device is disconnected from the access network device.

For example, the first indication information sent by the access network device to the terminal device indicates that the duration for which the terminal device is disconnected from the access network device is 3 milliseconds (ms). Therefore, the terminal device may be disconnected from the current access network device when there is a service need, and a disconnection duration is controlled within 3 ms.

Optionally, the first indication information may indicate a time pattern for the terminal device to be disconnected from the access network device.

The time pattern may reflect a situation of the disconnection of the terminal device from the access network device at different time periods or at different moments, which are not limited in the present disclosure.

For example, based on a protocol or an access network device configuration, the terminal device may be disconnected from the access network device, if needed, according to the time pattern from a moment it receives the first indication information, which is not limited in the present disclosure.

Optionally, the time pattern may include a plurality of time pairs.

Each time pair may include two moments, and the two moments may respectively represent a disconnection moment and a connection restoration moment. For example, if the disconnection moment is t1 and the connection restoration moment is t2, then the time pair may be expressed as (t1, t2), which is not limited in the present disclosure.

Optionally, time intervals between the disconnection moments and the connection moments in individual time pairs may be the same.

For example, the time pattern includes three time pairs, and the time intervals between the disconnection moments and the connection moments in individual time pairs are the same, all three are T, and the three time pairs may be expressed as (t1, t1+T), (t2, t2+T), and (t3, t3+T). Therefore, when there is the service need, the terminal device may be disconnected from the access network device at moment t1 and restore the connection with the access network device at moment t1+T; or it may further be disconnected from the access network device at moment t2 and restore the connection with the access network device at moment t2+T; or it may further be disconnected from the access network device at moment t3 and restore the connection with the access network device at moment t3+T, which is not limited in the present disclosure.

Optionally, time intervals between the disconnection moments and the connection moments in individual time pairs may be different.

For example, three time pairs in the time pattern are (t1, t1+2 ms), (t2, t2+5 ms), and (t3, t3+7 ms). Therefore, when there is the service need, the terminal device may be disconnected from the access network device at moment t1 and restore the connection with the access network device at moment t1+2 ms; or it may further be disconnected from the access network device at moment t2 and restore the connection with the access network device at moment t2+5 ms; or it may further be disconnected from the access network device at moment t3 and restore the connection with the access network device at moment t3+7 ms, which is not limited in the present disclosure.

Optionally, the time pattern may include the plurality of time pairs, and time intervals between the disconnection moments in every two adjacent time pairs may be the same.

For example, time pair 1, time pair 2, time pair 3 and time pair 4 are arranged in this order. A disconnection moment in the time pair 1 is moment t1, a disconnection moment in the time pair 2 is moment t1+2T, a disconnection moment in the time pair 3 is moment t1+4T, and a disconnection moment in the time pair 4 is moment t1+6T. Therefore, when there is the service need, the terminal device may be disconnected from the access network device at the moment t1; or it may further be disconnected from the access network device at the moment t1+2T; or it may further be disconnected from the access network device at the moment t1+4T; or it may further be disconnected from the access network device at the moment t1+6T, which is not limited in the present disclosure.

Optionally, the time pattern may include the plurality of time pairs, and the time intervals between the disconnection moments in every two adjacent time pairs may be different.

For example, time pair 1, time pair 2, time pair 3 and time pair 4 are arranged in this order. A disconnection moment in the time pair 1 is moment t1, a disconnection moment in the time pair 2 is moment t1+T, a disconnection moment in the time pair 3 is moment t1+6T, and a disconnection moment of the time pair 4 is moment t1+8T. Therefore, when there is the service need, the terminal device may be disconnected from the access network device at the moment t1; or it may further be disconnected from the access network device at the moment t1+T; or it may further be disconnected from the access network device at the moment t1+6T; or it may further be disconnected from the access network device at the moment t1+8T, which is not limited in the present disclosure.

Optionally, the time pattern may include the plurality of time pairs, and time intervals between the connection moments in every two adjacent time pairs may be the same.

For example, time pair 1, time pair 2 and time pair 3 are arranged in this order. A connection moment in the time pair 1 is moment t2, a connection moment in the time pair 2 is moment t2+T, and a connection moment in the time pair 3 is moment t2+2T. Therefore, when there is the service need, the terminal device may restore the connection with the access network device at the moment t2; it may further restore the connection with the access network device at the moment t2+T; or it may further restore the connection with the access network device at the moment t2+2T, which is not limited in the present disclosure.

Optionally, the time pattern may include the plurality of time pairs, and the time intervals between the connection moments in every two adjacent time pairs may be different.

For example, time pair 1, time pair 2, time pair 3 and time pair 4 are arranged in this order. A connection moment in the time pair 1 is moment t3, a connection moment in the time pair 2 is moment t3+3T, and a connection moment in the time pair 3 is moment t3+5T, and a connection moment in the time pair 4 is moment t3+9T. Therefore, when there is the service need, the terminal device may restore the connection with the access network device at the moment t3; or it may further restore the connection with the access network device at the moment t3+3T; or it may further restore the connection with the access network device at the moment t3+5T; or it may further restore the connection with the access network device at the moment t3+9T, which is not limited in the present disclosure.

Optionally, the first indication information may indicate a triggering event for the terminal device to be disconnected from the access network device.

There may be many types of triggering events, such as paging monitoring, measurement, reading a system message, which are not limited in the present disclosure.

For example, the first indication information indicates that the triggering event for the terminal device to be disconnected from the access network device is the paging monitoring. After receiving the first indication information, the terminal device may be disconnected from the access network device when there is a need for the paging monitoring, which is not limited in the present disclosure.

Optionally, the first indication information may indicate the triggering event for the terminal device to be disconnected from the access network device and a disconnection duration corresponding to each triggering event.

For example, the first indication information indicates that the triggering events for the terminal device to be disconnected from the access network device are the paging monitoring and the measurement, and a disconnection duration corresponding to the paging monitoring is 1 s and a disconnection duration corresponding to the measurement is 20 ms. After receiving the first indication information, the terminal device may be disconnected from the current access network device when there is the need for the paging monitoring, and control the disconnection duration within 1 s. Alternatively, it may be disconnected from the current access network device when there is a need for the measurement, and control the disconnection duration within 20 ms.

Optionally, the first indication information may indicate the triggering event for the terminal device to be disconnected from the access network device and a disconnection time pattern corresponding to each triggering event.

For example, the first indication information indicates that the triggering events for the terminal device to be disconnected from the access network device are the paging monitoring and the measurement respectively, and a disconnection time pattern corresponding to the paging monitoring includes 5 ms, 10 ms, and 12 ms, and the disconnection time pattern corresponding to the measurement includes 3 ms, 7 ms, and 15 ms. If a moment when the terminal device receives the first indication information is moment t, then when there is the need for the paging monitoring, the terminal device may be disconnected from the access network device at moment (t+5) ms, or at moment (t+10) ms, or at moment (t+12) ms. Alternatively, when there is the need for the measurement, the terminal device may be disconnected from the access network device at moment (t+3) ms, or at moment (t+7) ms, or at moment (t+15) ms.

Optionally, the first indication information may indicate that the triggering event for the terminal device to be disconnected from the access network device and a disconnection time interval corresponding to each triggering event.

For example, the first indication information indicates that the triggering events for the terminal device to be disconnected from the access network device are the paging monitoring and the reading the system message respectively, and a time interval corresponding to the paging monitoring is 5 ms, and a time interval corresponding to reading the system messages is 7 ms. That is, when the terminal device performs the paging monitoring, a time interval between each two disconnection moments, i.e., moments when being disconnected from the access network device is 5 ms. Alternatively, when the terminal device reads the system message, a time interval between each two disconnection moments, i.e., moments when being disconnected from the access network device is 7 ms. Therefore, after receiving the first indication information, the terminal device may be disconnected from the access network device according to the time interval corresponding to the paging monitoring when there is the need for the paging monitoring. Alternatively, when there is the need for reading the system message, it may be disconnected from the access network device according to the time interval corresponding to reading the system message.

It should be noted that the above examples are only illustrative and shall not be construed as limitations on the first indication information in the embodiments of the present disclosure.

It may be understood that the first indication information may include one or more of the above options, which is not limited in the present disclosure.

Optionally, the access network device may send the first indication information to the terminal device via an RRC message, which will not be elaborated here.

Optionally, the RRC message may be an RRC reconfiguration message, or may be an RRC connection reconfiguration message, which is not limited in the present disclosure.

By implementing the embodiments of the present disclosure, the access network device may send the first indication information to the terminal device to instruct the connection switching configuration to the terminal device. As a result, the terminal device may be disconnected from the access network device according to the indication of the network device, thereby ensuring that the communication transmission of the currently connected access network device will not be affected and avoiding the failure of other access network services, thus improving the reliability of the multi-card terminal device.

Referring to FIG. 3, which is a schematic flowchart of a method for controlling connection switching provided by embodiments of the present disclosure, the method is performed by an access network device. As shown in FIG. 3, the method may include, but is not limited to, the following steps.

In step 31, first indication information is sent to a terminal device via an RRC message, in which the first indication information is configured to indicate N connection switching configurations for the terminal device, and the terminal device includes at least two subscriber identity recognition modules, where N may be a positive integer greater than 1.

For example, a protocol defines that specific bits may be added to the RRC message, and the added bits are configured to represent a connection switching configuration. Therefore, the access network device may send the first indication information to the terminal device via the RRC message, so that after receiving the first indication information sent by the access network device, the terminal device, according to the protocol, learns the connection switching configuration according to values of the specific bits, which is not limited in the present disclosure.

Optionally, the RRC message may be an RRC reconfiguration message, or may be an RRC connection reconfiguration message, which is not limited in the present disclosure.

It should be noted that, for the contents contained in the first indication information and specific implementation manners thereof, reference may be made to the descriptions of other individual embodiments of the present disclosure, and will not be elaborated here again.

In step 32, second indication information is sent to the terminal device, in which the second indication information is configured to activate at least one connection switching configuration.

For example, a connection switching configuration indicated by the first indication information is that a duration for which the terminal device is disconnected from the access network device is 5 ms, and a triggering event for the terminal device to be disconnected from the access network device is paging monitoring. Further, the second indication information instructs the terminal device to activate the duration for which the terminal device is disconnected from the access network device. That is, after receiving the second indication information, the terminal device may control the duration of being disconnected from the access network device within 5 ms.

It should be noted that the above examples are only illustrative and shall not be construed as limitations on the first indication information and the second indication information in the embodiments of the present disclosure.

By implementing the embodiments of the present disclosure, the access network device may send the first indication information to the terminal device via the RRC message to indicate the N connection switching configurations for the terminal device, and may also send the second indication information to the terminal device to instruct the activation of at least one connection switching configuration to the terminal device. As a result, the terminal device may be disconnected from the access network device according to the indication of the network device, thereby ensuring that the communication transmission of the currently connected access network device will not be affected and avoiding the failure of other access network services, thus improving the reliability of the multi-card terminal device.

Referring to FIG. 4, which is a schematic flowchart of a method for controlling connection switching provided by embodiments of the present disclosure, the method is performed by an access network device. As shown in FIG. 4, the method may include, but is not limited to, the following steps.

In step 41, third indication information sent by a terminal device is received, in which the third indication information includes a triggering event for the terminal device to be disconnected from the access network device.

It may be understood that there may be one or more of the triggering events contained in the third indication information, which is not limited in the present disclosure.

It should be noted that, for specific contents of the triggering event, reference may be made to the descriptions of other embodiments of the present disclosure, and will not be elaborated here again.

In the embodiments of the present disclosure, in order to ensure the normal communication transmission, the terminal device may send the third indication information to the access network device. Therefore, after receiving the third indication information sent by the terminal device, the access network device may determine the triggering event for the terminal device to be disconnected from the access network device, thereby ensuring the normal communication transmission.

In step 42, in response to receiving a request sent by the terminal device to acquire the connection switching configuration, first indication information is sent to the terminal device, in which the first indication information is configured to indicate the connection switching configuration for the terminal device, and the terminal device includes at least two subscriber identity recognition modules.

For example, triggering events indicated by the third indication information are the paging monitoring and the measurement, and the first indication information indicates that a duration for which the terminal device is disconnected from the access network device is 3 ms. Then, when there is a need for the paging monitoring or the measurement, the terminal device may be disconnected from the current access network device and control a disconnection duration within 3 ms.

Alternatively, triggering events indicated by the third indication information are the paging monitoring and the measurement, and the first indication information indicates that a disconnection duration corresponding to the paging monitoring is 5 ms and a disconnection duration corresponding to the measurement is 8 ms. After receiving the first indication information, the terminal device may be disconnected from the current access network device when there is a need for the paging monitoring, and control the disconnection duration within 5 ms, or it may be disconnected from the current access network device when there is a need for the measurement, and control the disconnection duration within 8 ms.

Alternatively, triggering events indicated by the third indication information are the paging monitoring and the measurement, and the first indication information indicates that a time pattern for the terminal device to be disconnected from the access network device includes 5 ms, 10 ms, and 12 ms. If a moment when the terminal device receives the first indication information is moment t, the terminal device may be disconnected from the access network device at moment (t+5) ms, or at moment (t+10) ms, or at moment (t+12) ms when there is a need for the paging monitoring or the measurement.

Alternatively, triggering events indicated by the third indication information are the paging monitoring and the reading system message, and the first indication information indicates that a time interval corresponding to the paging monitoring is 5 ms and a time interval corresponding to the reading of the system message is 7 ms. That is, when the terminal device performs the paging monitoring, a time interval between each two disconnection moments, i.e., moments disconnected from the access network device is 5 ms. Alternatively, when the terminal device performs the reading of the system message, a time interval between each two disconnection moments, i.e., moments disconnected from the access network device is 7 ms. Therefore, after receiving the first indication information, the terminal device may be disconnected from the access network device according to the time interval corresponding to the paging monitoring when there is a need for the paging monitoring. Alternatively, the terminal device may be disconnected from the access network device according to the time interval corresponding to the reading of the system message when there is a need for the reading of the system message.

Alternatively, triggering events indicated by the third indication information are the paging monitoring and the measurement, a disconnection time pattern corresponding to the paging monitoring indicated by the first indication information includes 5 ms, 10 ms, and 12 ms, and a disconnection time pattern corresponding to the measurement includes 3 ms, 7 ms, and 15 ms. If a moment when the terminal device receives the first indication information is moment t, the terminal device may be disconnected from the access network device at moment (t+5) ms, or at moment (t+10) ms, or at moment (t+12) ms when there is a need for the paging monitoring. Alternatively, the terminal device may be disconnected from the access network device at moment (t+3) ms, or at moment (t+7) ms, or at moment (t+15) ms when there is a need for the measurement.

It should be noted that the above examples are only illustrative and shall not be construed as limitations on the third indication information and the first indication information in the embodiments of the present disclosure.

It should be noted that, for the contents of the first indication information and specific implementation manner thereof, reference may be made to the descriptions of other individual embodiments of the present disclosure, and will not be elaborated here again.

By implementing the embodiments of the present disclosure, the access network device may first receive the third indication information sent by the terminal device, and when receiving the request sent by the terminal device to acquire the connection switching configuration, send the first indication information to the terminal device to instruct the connection switching configuration to the terminal device. As a result, the terminal device may be disconnected from the access network device according to the indication of the network device, thereby ensuring that the communication transmission of the currently connected access network device will not be affected and avoiding the failure of other access network services, thus improving the reliability of the multi-card terminal device.

Referring to FIG. 5, which is a schematic flowchart of a method for controlling connection switching provided by embodiments of the present disclosure, the method is performed by an access network device. As shown in FIG. 5, the method may include, but is not limited to, the following steps.

In step 51, in response to establishing a connection with the terminal device, the first indication information is sent to the terminal device, in which the first indication information is configured to indicate the connection switching configuration for the terminal device, and the terminal device includes at least two subscriber identity recognition modules.

When the access network device establishes the connection with the terminal device, the access network device may send the first indication information to the terminal device, so that the terminal device may learn the connection switching configuration according to the first indication information, and perform switching the connection based on the connection switching configuration. This not only ensures that the communication transmission of the currently connected access network device will not be affected, but also avoids the failure of other access network services, thus improving the reliability of the multi-card terminal device.

It should be noted that, for the contents of the first indication information and specific implementation manners thereof, reference may be made to the descriptions of other embodiments of the present disclosure, and will not be elaborated here again.

In step 52, a to-be-activated connection switching configuration is determined.

It may be understood that one or more to-be-activated connection switching configurations may be provided, which is not limited in the present disclosure.

In the embodiments of the present disclosure, the access network device may determine the to-be-activated connection switching configuration according to a protocol or a current network status, which is not limited in the present disclosure.

In step 53, values of individual bits in a media access control (MAC) control element (CE) configured to send the second indication information are determined according to the to-be-activated connection switching configuration.

The media access control (MAC) is mainly responsible for controlling and connecting a physical media of a physical layer.

It may be understood that a correspondence between the connection switching configuration and the bits of the MAC control element (CE) configured to send the second indication information may be agreed upon in a protocol. Afterwards, the values of individual bits in the MAC CE configured to send the second indication information are determined according to the to-be-activated connection switching configuration.

For example, the protocol defines that there is a one-to-one correspondence between the connection switching configuration and the bits of the MAC CE configured to send the second indication information. For example, a first connection switching configuration corresponds to a first bit of the MAC CE, a second connection switching configuration corresponds to a second bit of the MAC CE, and so on, which is not limited in the present disclosure.

Optionally, a value of a bit corresponding to the to-be-activated connection switching configuration is set to 1 through the protocol, and values of bits corresponding to remaining inactive connection switching configurations is set to 0. Alternatively, values of bits corresponding to the to-be-activated connection switching configurations may be set to a specific value.

For example, if the to-be-activated connection switching configurations are the first configuration and the third configuration respectively, then values of the first and third bits of the MAC CE may be set to 1.

Alternatively, it may also be agreed upon in a protocol that a plurality of the bits of the MAC CE represent one connection switching configuration. For example, the MAC CE contains 4 bits. When a value of the 4 bits is 0001, it represents a first connection switching configuration. When the value of the 4 bits is 0010, it represents a second connection switching configuration. When the value of the 4 bits is 0011, it corresponds to a third connection switching configuration. When the value of the 4 bits is 0100, it represents a fourth connection switching configuration.

It should be noted that the above examples are only illustrative and shall not be construed as limitations on a number of bits contained in the MAC CE, the values of individual bits, and the correspondence between the bits of the MAC CE and the connection switching configuration in the embodiments of the present disclosure.

Optionally, in embodiments of the present disclosure, the number of bits contained in the MAC CE may be determined in two manners, and any one of the manners may be used according to the protocol.

Optionally, the number of bits contained in the MAC CE may be determined based on the following formula (1):

$$\left( \left\lceil \frac{\lceil \log_2 N \rceil}{8} \right\rceil + 1 \right) * 8 - 1 \tag{1}$$

where N is a number of connection switching configurations contained in the first indication information, $\lceil \log_2 N \rceil$ means rounding up of $\log_2 N$, and $$\left\lceil \frac{\lceil \log_2 N \rceil}{8} \right\rceil$$

means rounding of $$\frac{\lceil \log_2 N \rceil}{8}.$$

It should be noted that if the formula (1) is used to determine the number of bits contained in the MAC CE, only one connection switching configuration may be activated via the MAC CE at a time.

Optionally, the number of bits contained in the MAC CE may also be determined based on the following formula (2):

$$\left( \left\lceil \frac{N}{8} \right\rceil + 1 \right) * 8 - 1 \qquad (2)$$

where N is a number of connection switching configurations contained in the first indication information, and $$\left\lceil \frac{N}{8} \right\rceil$$

means rounding of $$\frac{N}{8}.$$

It should be noted that if the formula (2) is used to determine the number of bits contained in the MAC CE, one connection switching configuration may be activated at a time via the MAC CE, or a plurality of connection switching configurations may be activated at a time.

For example, if a value of N is 9, and the formula (1) is used to determine the number of bits contained in the MAC CE, then a structure of the MAC CE may be shown in FIG. 5A, where R is a placeholder, and $c1$ to $c7$ are respectively individual bits contained in the MAC CE.

Alternatively, the formula (2) is used to determine the number of bits contained in the MAC CE, and a structure of the MAC CE may be shown in FIG. 5B, where R is a placeholder, and $c1$ to $c15$ are respectively individual bits contained in the MAC CE.

It should be noted that the above examples are only illustrative and shall not be construed as limitations on the value of N, and the number of bits contained in the MAC CE in the embodiments of the present disclosure.

In step 54, the second indication information is sent to the terminal device via the MAC CE, in which the second indication information is configured to activate at least one connection switching configuration.

In the embodiments of the present disclosure, after the access network device determines the values of individual bits in the MAC CE configured to send the second indication information, the access network device may send the second indication information to the terminal device via the MAC CE to instruct an activation of at least one connection switching configuration to the terminal device. Therefore, after receiving the MAC CE, the terminal device may activate at least one connection switching configuration when there is a service need.

By implementing the embodiments of the present disclosure, the access network device may, when establishing the connection with the terminal device, send the first indication information to the terminal device to instruct the connection switching configuration to the terminal device. The access network device may further determine the to-be-activated connection switching configuration, determine the values of individual bits in the media access control (MAC) control element (CE) configured to send the second indication information according to the to-be-activated connection switching configuration, and send the second indication information to the terminal device via the MAC CE. As a result, the terminal device may be disconnected from the access network device according to the indication of the network device, thereby ensuring that the communication transmission of the currently connected access network device will not be affected and avoiding the failure of other access network services, thus improving the reliability of the multi-card terminal device.

In the above embodiments provided by the present disclosure, the methods provided in the embodiments of the present disclosure are introduced from a perspective of the access network device. In order to implement the various functions in the methods provided by the above embodiments of the present disclosure, the access network device may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Figure 6:
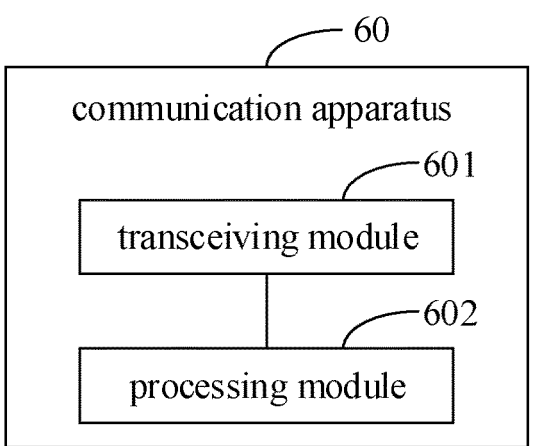
FIG. 6 is a schematic block diagram of a communication apparatus according to an embodiment of the present disclosure.

Referring to FIG. 6, which is a schematic block diagram of a communication apparatus 60 provided by embodiments of the present disclosure, the communication apparatus 60 shown in FIG. 6 may include a transceiving module 601 and a processing module 602.

The transceiving module 601 may include a sending module and/or a receiving module, the sending module is configured to implement a sending function, and the receiving module is configured to implement a receiving function. The transceiving module 601 may implement the sending function and/or the receiving function.

It may be understood that the communication apparatus 60 may be an access network device, an apparatus in the access network device, or an apparatus that can be used in conjunction with the access network device.

The communication apparatus 60 includes the transceiving module 601 configured to send first indication information to a terminal device. The first indication information is configured to indicate a connection switching configuration for the terminal device, and the terminal device includes at least two subscriber identity recognition modules.

Optionally, the transceiving module 601 is specifically configured to send the first indication information to the terminal device via a radio resource control (RRC) message.

Optionally, the RRC message is one of: an RRC reconfiguration message and an RRC connection reconfiguration message.

Optionally, the first indication information includes at least one of: a duration for which the terminal device is disconnected from the access network device; a time pattern for the terminal device to be disconnected from the access network device; a triggering event for the terminal device to be disconnected from the access network device; the triggering event for the terminal device to be disconnected from the access network device and a disconnection duration corresponding to each triggering event; the triggering event for the terminal device to be disconnected from the access network device and a disconnection time pattern corresponding to each triggering event; and the triggering event for the terminal device to be disconnected from the access network device and a disconnection time interval corresponding to each triggering event.

Optionally, the time pattern includes a plurality of time pairs. Time intervals between disconnection moments and connection moments in individual time pairs are the same, or time intervals between disconnection moments and connection moments in individual time pairs are different.

Optionally, the time pattern includes a plurality of time pairs. Every two adjacent time pairs meet one of the following conditions: time intervals between disconnection moments in every two adjacent time pairs being the same; the time intervals between the disconnection moments in every two adjacent time pairs being different; time intervals between connection moments in every two adjacent time pairs being the same; and the time intervals between the connection moments in every two adjacent time pairs being different.

Optionally, the transceiving module 601 is further configured to receive third indication information sent by the terminal device. The third indication information includes the triggering event.

Optionally, the first indication information includes N connection switching configurations, where N is a positive integer greater than 1, and the transceiving module 601 is further configured to send second indication information to the terminal device. The second indication information is configured to activate at least one connection switching configuration.

Optionally, the transceiving module 601 is further specifically configured to send the second indication information to the terminal device via a media access control (MAC) control element (CE).

Optionally, the apparatus further includes: the processing module 602 configured to determine a to-be-activated connection switching configuration.

The processing module 602 is further configured to determine values of individual bits in the MAC CE configured to send the second indication information according to the to-be-activated connection switching configuration.

Optionally, a number of bits contained in the MAC CE is:

$$\left(\left\lceil\frac{\lceil\log_2 N\rceil}{8}\right\rceil + 1\right)*8 - 1;$$

or a number of bits contained in the MAC CE is:

$$\left(\left\lceil\frac{N}{8}\right\rceil + 1\right)*8 - 1.$$

Optionally, the transceiving module 601 is further specifically configured to: in response to receiving a request sent by the terminal device to acquire the connection switching configuration, send the first indication information to the terminal device; or in response to establishing a connection with the terminal device, send the first indication information to the terminal device.

For the functions and specific implementation principles of the above individual modules in the embodiments of the present disclosure, reference may be made to the above individual method embodiments and will not be elaborated here again.

With the communication apparatus provided by the present disclosure, the access network device may send the first indication information to the terminal device to instruct the connection switching configuration to the terminal device. As a result, the terminal device may be disconnected from the access network device according to the indication of the network device, thereby ensuring that the communication transmission of the currently connected access network device will not be affected and avoiding the failure of other access network services, thus improving the reliability of the multi-card terminal device.

Figure 7:
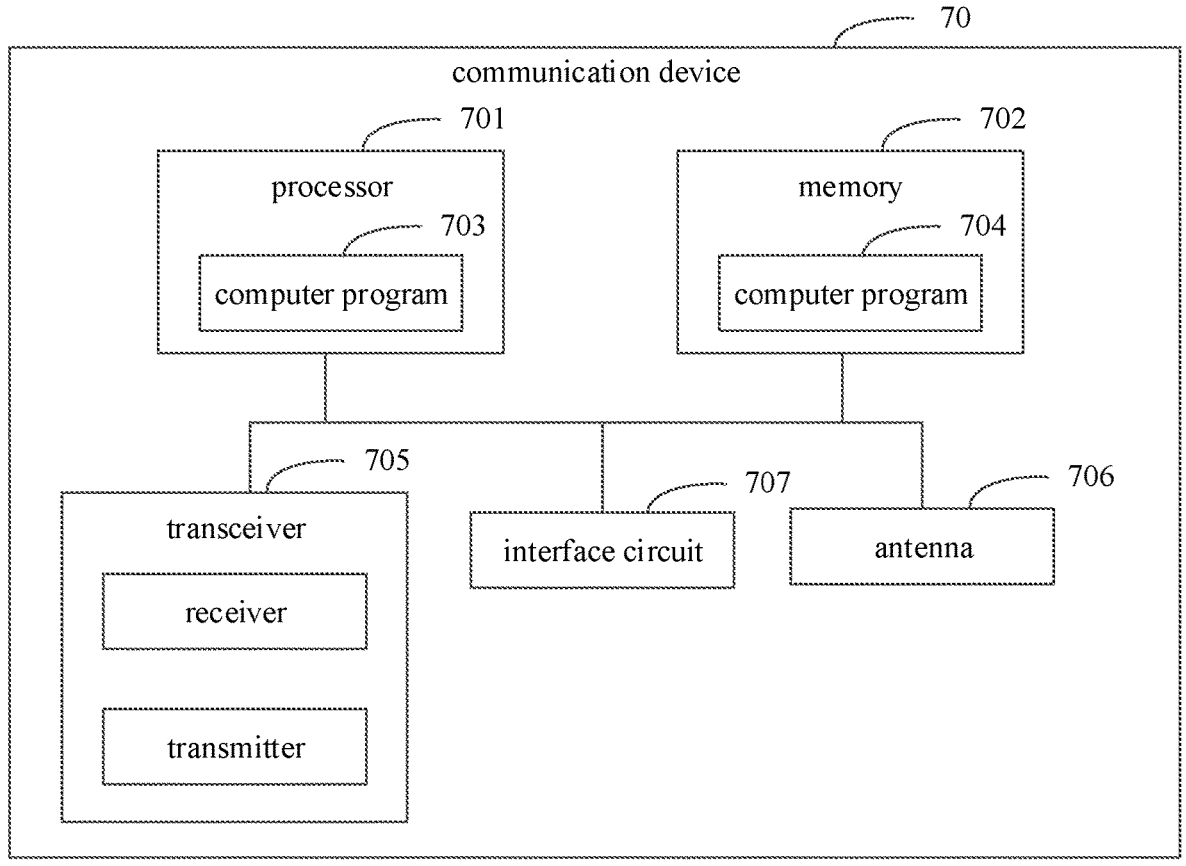
FIG. 7 is a schematic block diagram of a communication device according to an embodiment of the present disclosure.

Referring to FIG. 7, which is a schematic block diagram of a communication device 70 provided by embodiments of the present disclosure, the communication device 70 may be an access network device, and may also be a chip, a chip system, or a processor that supports the access network device to implement the above methods. The device may be configured to implement the methods as described in the above method embodiments, and for details, reference may be made to the descriptions in the above method embodiments.

The communications device 70 may include one or more processors 701. The processor 701 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, the terminal device, a terminal device chip, a DU or a CU, etc.) to execute computer programs, and process data of computer programs.

Optionally, the communication device 70 may further include one or more memories 702 having stored therein a computer program 704. The processor 701 executes the computer program 704, to cause the communication device 70 to implement the methods as described in the above method embodiments. Optionally, the memory 702 may have stored therein data. The communication device 70 and the memory 702 may be provided separately or integrated together.

Optionally, the communication device 70 may further include a transceiver 705 and an antenna 706. The transceiver 705 may be called a transceiving element, a transceiving machine, a transceiving circuit or the like, for implementing a transceiving function. The transceiver 705 may include a receiver and a transmitter. The receiver may be called a receiving machine, a receiving circuit or the like, for implementing a receiving function. The transmitter may be called a sending machine, a sending circuit or the like, for implementing a sending function.

Optionally, the communication device 70 may further include one or more interface circuits 707. The interface circuit 707 is configured to receive a code instruction and transmit the code instruction to the processor 701. The processor 701 runs the code instruction to enable the communication device 70 to execute the methods as described in the foregoing method embodiments.

In a case where the communication device 70 is the access network device, the transceiver 705 is configured to execute the step 21 in FIG. 2, the step 31 in FIG. 3, the step 32 in FIG. 3, the step 41 in FIG. 4, the step 42 in FIG. 4, the step 51 in FIG. 5, or the step 54 in FIG. 5. The processor 701 is configured to execute the step 52 in FIG. 5, or the step 53 in FIG. 5.

In an implementation manner, the processor 701 may include a transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation manner, the processor 701 may have stored therein a computer program 703 that, when run on the processor 701, causes the communication device 70 to implement the methods as described in the foregoing method embodiments. The computer program 703 may be embedded in the processor 701, and in this case, the processor 701 may be implemented by a hardware.

In an implementation manner, the communication device 70 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may be manufactured using various IC process technologies, such as a complementary metal oxide semiconductor (CMOS), a negative metal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the access network device, but the scope of the communication device described in the present disclosure is not limited thereto, and a structure of the communication device is not limited by FIG. 7. The communication device may be a stand-alone device or may be a part of a larger device. For example, the communication device may be: (1) a stand-alone integrated circuit (IC), or a chip, or a chip system or subsystem; (2) a set of one or more ICs, optionally, the set of ICs may include a storage component for storing data and computer programs; (3) an ASIC, such as a modem; (4) a module that may be embedded in other devices; (5) a receiver, a terminal device, an intelligent terminal device, a cellular phone, a wireless device, a handheld machine, a mobile unit, a vehicle device, a network device, a cloud device, or an artificial intelligence device; (6) others.

Figure 8:
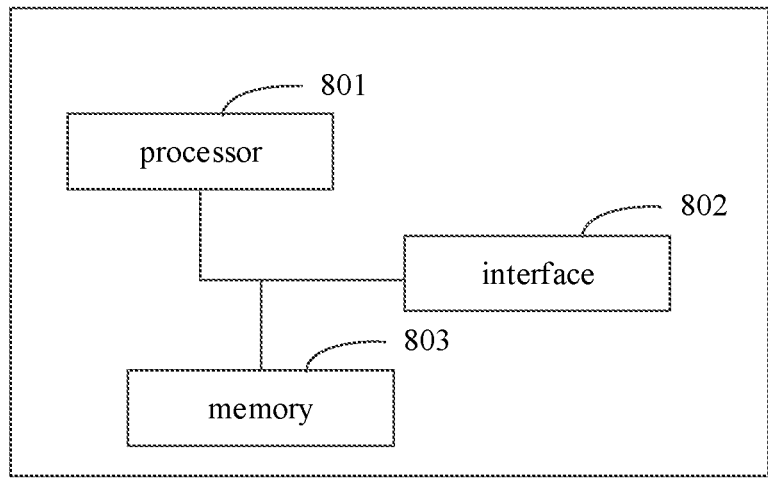
FIG. 8 is a schematic block diagram of a chip according to an embodiment of the present disclosure.

For the case where the communication device may be a chip or a chip system, reference may be made to a schematic diagram of the chip shown in FIG. 8. The chip shown in FIG. 8 includes a processor 801 and an interface 802. In the chip, one or more processors 801 may be provided, and a plurality of interfaces 802 may be provided.

For the case where the chip is used to implement functions of the access network device in the embodiments of the present disclosure, the interface 802 is configured to execute the step 21 in FIG. 2, the step 31 in FIG. 3, the step 32 in FIG. 3, the step 41 in FIG. 4, the step 42 in FIG. 4, the step 51 in FIG. 5, or the step 54 in FIG. 5.

Optionally, the chip further includes a memory 803 for storing necessary computer programs and data.

Those skilled in the art may understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Embodiments of the present disclosure further provide a system for controlling connection switching. The system includes the communication apparatus as the access network device as described in the aforementioned embodiments in FIG. 6, or the system includes the communication device as the access network device as described in the aforementioned embodiments in FIG. 7.

The present disclosure further provides a communication device, which may include a processor and a memory having stored therein a computer program that, when executed by the processor, causes functions of any of the above method embodiments to be implemented.

The present disclosure further provides a non-transitory computer-readable storage medium having stored thereon instructions that, when executed, cause functions of any of the above method embodiments to be implemented.

The present disclosure further provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or some of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website, computer, server or data center in a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

Those of ordinary skill in the art can understand that the first, second, and other numeral numbers involved in the present disclosure are distinguished only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

The correspondence shown in each table in the present disclosure may be configured or predefined. The values of information in each table are only examples, and may be configured as other values, which are not limited in the present disclosure. When configuring a correspondence between the information and various parameters, it is not necessary to configure all the correspondences shown in the tables. For example, the correspondences shown in some rows of the tables in the present disclosure may not be configured. For another example, appropriate variations or adjustments (such as splitting, merging, and so on) can be made based on the above table. The names of parameters shown in the titles of the above tables may also adopt other names understandable in the communication device, and the values or representations of the parameters may also be other values or representations understandable in the communication device. When the above tables are implemented, other data structures may also be used, for example, arrays, queues, containers, stacks, linear tables, pointers, linked lists, trees, graphs, structural bodies, classes, heaps, or hash tables may be used.

The term "predefined" in the present disclosure may be understood as defined, defined in advance, stored, pre-stored, pre-negotiated, pre-configured, cured, or pre-recorded.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such an implementation should not be considered as extending beyond the scope of the present disclosure.

Those skilled in the art can clearly understand that for the convenience and conciseness of the description, for the specific working process of the above-described system, device and unit, reference may be made to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for controlling connection switching, performed by an access network device and comprising:

sending first indication information to a terminal device, wherein the first indication information indicates a connection switching configuration for the terminal device, and the terminal device comprises at least two subscriber identity recognition modules;

wherein the first indication information comprises N connection switching configurations, where N is a positive integer greater than 1, and wherein the method further comprises:

sending second indication information to the terminal device, wherein the second indication information activates at least one connection switching configuration;

wherein sending the second indication information to the terminal device comprises:

sending the second indication information to the terminal device via a media access control (MAC) control element (CE);

wherein a number of bits contained in the MAC CE is:

$$\left(\left[\frac{\lceil \log_2 N \rceil}{8}\right] + 1\right) * 8 - 1;$$

or a number of bits contained in the MAC CE is:

$$\left(\left[\frac{N}{8}\right] + 1\right) * 8 - 1.$$

2. The method according to claim 1, wherein sending the first indication information to the terminal device comprises:

sending the first indication information to the terminal device via a radio resource control (RRC) message.

3. The method according to claim 2, wherein the RRC message is one of: an RRC reconfiguration message and an RRC connection reconfiguration message.

4. The method according to claim 1, wherein the first indication information comprises at least one of:

a duration for which the terminal device is disconnected from the access network device;

a time pattern for the terminal device to be disconnected from the access network device;

a triggering event for the terminal device to be disconnected from the access network device;

the triggering event for the terminal device to be disconnected from the access network device and a disconnection duration corresponding to each triggering event;

the triggering event for the terminal device to be disconnected from the access network device and a disconnection time pattern corresponding to each triggering event; and the triggering event for the terminal device to be disconnected from the access network device and a disconnection time interval corresponding to each triggering event.

5. The method according to claim 4, wherein the time pattern comprises a plurality of time pairs, wherein time intervals between disconnection moments and connection moments in individual time pairs are the same, or time intervals between disconnection moments and connection moments in individual time pairs are different.

6. The method according to claim 4, wherein the time pattern comprises a plurality of time pairs, wherein every two adjacent time pairs meet one of the following conditions:

time intervals between disconnection moments in every two adjacent time pairs being the same;

the time intervals between the disconnection moments in every two adjacent time pairs being different;

time intervals between connection moments in every two adjacent time pairs being the same; and the time intervals between the connection moments in every two adjacent time pairs being different.

7. The method according to claim 4, further comprising:

receiving third indication information sent by the terminal device, wherein the third indication information comprises the triggering event.

8. The method according to claim 1, further comprising:

determining a to-be-activated connection switching configuration; and determining values of individual bits in the MAC CE configured to send the second indication information according to the to-be-activated connection switching configuration.

9. The method according to claim 1, wherein sending the first indication information to the terminal device comprises:

in response to receiving a request sent by the terminal device to acquire the connection switching configuration, sending the first indication information to the terminal device; or in response to establishing a connection with the terminal device, sending the first indication information to the terminal device.

10. An access network device, comprising:

a processor; and a memory having stored therein a computer program that, when executed by the processor, causes a method for controlling connection switching to be implemented, the method comprising:

sending first indication information to a terminal device, wherein the first indication information indicates a connection switching configuration for the terminal device, and the terminal device comprises at least two subscriber identity recognition modules;

wherein the first indication information comprises N connection switching configurations, where N is a positive integer greater than 1, and wherein the method further comprises:

sending second indication information to the terminal device, wherein the second indication information activates at least one connection switching configuration;

wherein sending the second indication information to the terminal device comprises:

sending the second indication information to the terminal device via a media access control (MAC) control element (CE);

wherein a number of bits contained in the MAC CE is:

$$\left(\left[\frac{\lceil\log_2 N\rceil}{8}\right]+1\right)*8-1;$$

or a number of bits contained in the MAC CE is:

$$\left(\left[\frac{N}{8}\right]+1\right)*8-1.$$

11. The access network device according to claim 10, wherein sending the first indication information to the terminal device comprises:

sending the first indication information to the terminal device via a radio resource control (RRC) message, wherein the RRC message is one of: an RRC reconfiguration message and an RRC connection reconfiguration message.

12. The access network device according to claim 10, wherein the first indication information comprises at least one of:

a duration for which the terminal device is disconnected from the access network device;

a time pattern for the terminal device to be disconnected from the access network device;

a triggering event for the terminal device to be disconnected from the access network device;

the triggering event for the terminal device to be disconnected from the access network device and a disconnection duration corresponding to each triggering event;

the triggering event for the terminal device to be disconnected from the access network device and a disconnection time pattern corresponding to each triggering event; and the triggering event for the terminal device to be disconnected from the access network device and a disconnection time interval corresponding to each triggering event.

13. The access network device according to claim 12, wherein the time pattern comprises a plurality of time pairs, wherein time intervals between disconnection moments and connection moments in individual time pairs are the same, or time intervals between disconnection moments and connection moments in individual time pairs are different.

14. The access network device according to claim 12, wherein the time pattern comprises a plurality of time pairs, wherein every two adjacent time pairs meet one of the following conditions:

time intervals between disconnection moments in every two adjacent time pairs being the same;

the time intervals between the disconnection moments in every two adjacent time pairs being different;

time intervals between connection moments in every two adjacent time pairs being the same;

the time intervals between the connection moments in every two adjacent time pairs being different.

15. A communication device, comprising:

a processor; and an interface circuit configured to receive a code instruction and transmit the code instruction to the processor;

wherein the processor is configured to run the code instruction to implement the method according to claim 1.

16. A non-transitory computer-readable storage medium having stored therein instructions that, when executed, cause a method for controlling connection switching to be implemented, the method comprising:

sending first indication information to a terminal device, wherein the first indication information indicates a connection switching configuration for the terminal device, and the terminal device comprises at least two subscriber identity recognition modules;

wherein the first indication information comprises N connection switching configurations, where N is a positive integer greater than 1, and wherein the method further comprises:

sending second indication information to the terminal device, wherein the second indication information activates at least one connection switching configuration;

wherein sending the second indication information to the terminal device comprises:

sending the second indication information to the terminal device via a media access control (MAC) control element (CE);

wherein a number of bits contained in the MAC CE is:

$$\left(\left\lceil \frac{\lceil \log_2 N \rceil}{8} \right\rceil + 1\right) * 8 - 1;$$

or a number of bits contained in the MAC CE is:

$$\left(\left\lceil \frac{N}{8} \right\rceil + 1\right) * 8 - 1.$$

* * * * *